United States Patent [19]

Karwath

[11] Patent Number: 5,537,015
[45] Date of Patent: Jul. 16, 1996

[54] SEMICONDUCTOR CIRCUIT FOR A DC MOTOR

[75] Inventor: Arno Karwath, Rottweil, Germany

[73] Assignee: Papst-Motoren GmbH & Co. KG, St. Georgen, Germany

[21] Appl. No.: 305,145

[22] Filed: Sep. 13, 1994

[30] Foreign Application Priority Data

Sep. 15, 1993 [DE] Germany .............................. 9313948 U

[51] Int. Cl.$^6$ ................................... H01R 39/46
[52] U.S. Cl. ........................ 318/439; 318/254; 318/138
[58] Field of Search ..................... 318/254, 138, 318/439; 388/503, 806

[56] References Cited

U.S. PATENT DOCUMENTS

| | | | |
|---|---|---|---|
| 3,873,897 | 3/1975 | Mueller | 318/138 |
| 4,247,808 | 1/1981 | Hanner | 318/439 |
| 4,274,037 | 6/1981 | Soeda | 318/439 |
| 4,329,630 | 5/1982 | Park | 318/254 |
| 4,449,079 | 5/1984 | Erdman | 318/138 |
| 4,588,933 | 5/1986 | Sun | 318/254 |
| 5,029,229 | 7/1991 | Nelson, III | 318/439 |
| 5,059,766 | 10/1991 | Gilliland | 318/254 |
| 5,267,344 | 11/1993 | Nelson, III | 318/439 |

FOREIGN PATENT DOCUMENTS

| | | |
|---|---|---|
| 0440534A1 | 8/1991 | European Pat. Off. . |
| 0467085A1 | 1/1992 | European Pat. Off. . |
| 2538835A1 | 3/1976 | Germany . |
| 2834523C2 | 2/1980 | Germany . |
| 2842145A1 | 4/1980 | Germany . |
| 3106856C2 | 12/1981 | Germany . |
| 3145248A1 | 5/1983 | Germany . |
| 3327761C2 | 5/1984 | Germany . |
| 4110495A1 | 10/1992 | Germany . |
| 4141106A1 | 6/1993 | Germany . |
| 9204811U1 | 9/1993 | Germany . |

OTHER PUBLICATIONS

Engl. abstract of Shigeizumi/Toshiba 58–75492–A, pub. May 1983.
Engl. abstract of Satou/Aichi Denki 60–51490–A, pub. Mar. 1985.
Engl. abstract of Hirose/Yasukawa 60–200,794–A, pub. Oct. 1985.

(List continued on next page.)

Primary Examiner—William M. Shoop, Jr.
Assistant Examiner—Karen Masih
Attorney, Agent, or Firm—Klaus Lenz; Hans Raible

[57] ABSTRACT

It is an object of the invention to provide a transistorized full-bridge driving circuit for an electronically commutated collectorless dc motor, in which burnout of the pnp transistors from overvoltage is avoided. This is accomplished by an arrangement with a collectorless dc motor (19) commutated by a semiconductor circuit, with a rectified-current intermediate circuit (13,14) supplied via a rectifier (11) from an AC current network, the intermediate circuit having an input to which is applied a fluctuating rectified current with predetermined maximum values, with a transistor (12, 112) located between the rectifier and the collectorless dc motor, the transistor being driven as a variable resistor, and with limiting means (25–27), for limiting the voltage at the control input of this transistor (12, 112) to a value smaller than the predetermined maximal value of the fluctuating rectified voltage and which control voltage falls within the voltage-tolerance range of the semiconductor driving circuit of the collectorless dc motor. The use of the limiting means, in combination with the transistor operated as a variable resistor, limits the voltage in the rectified-current intermediate circuit to an upper value, e.g. 270 V, so that standard commercial pnp- and npn-transistors can be used for the semiconductor driving circuit for commutation of the collectorless dc motor, and in this manner the semiconductor circuit is protected from overvoltage conditions. In the transistor which is driven as a variable resistor, corresponding losses do arise, but one avoids losses which would otherwise occur in a corresponding low-voltage power supply, so that overall a very good operating level results.

23 Claims, 4 Drawing Sheets

OTHER PUBLICATIONS

Engl. abstract of Nunokawa/Sanyo 63–117,684–A, pub. May 1988.

Rolf Mueller, "Zweipulsige kollektorlose Gleichstrom motoren," [Two–pulse collector–less direct current motors], in *ASR Digest fuer angewandte Antriebstechnik,* 1977, # 1–2, pp. 27–31.

SGS–Thomson Microelectronics, "STP4N40FI N–Channel Enhancement Mode Power MOS Transistor," datasheet May 1992, pp. 697–703.

SEMICONDUCTOR CIRCUIT FOR A DC MOTOR

Cross-reference to related patent, the disclosure of which is hereby incorporated by reference: U.S. Pat. No. 3,873,897, Mueller/Papst-Motoren KG, issued March '75.

FIELD OF THE INVENTION

The present invention relates generally to a collectorless dc motor commutated by a semiconductor circuit and, more particularly, to an improvement in such a semiconductor circuit.

BACKGROUND

Prior art circuits of this kind are known, for example, from German utility model 92 04 811, PAPST-MOTOREN, published Sep. 16, 1993, the entire con,tents of which are incorporated by reference, for the sake of brevity. Such devices are well adapted for driving combustion blowers, as taught by German patent application DE 41 41 106 A1, AMRHEIN et al./PAPST-MOTOREN, pub. 17 June '93, and which are driven by a collectorless dc motor.

Such devices must satisfy a number of requirements. Among other things, the rotary speed of the blower must be varied as a function of the desired heat output, in order to obtain optimal combustion of the fuel (oil or gas), and to minimize formation of toxic compounds in the exhaust gas. For such rotary-speed-regulated operation, dc motors are particularly well adapted, especially those operated in bridge circuits, since this permits a broad control range and simple control interventions. This is especially true of so-called two-pulse collectorless dc motors, as shown in U.S. Pat. No. 3,873,897, Mueller/Papst-Motoren, and German DE 23 46 380 C3. If such motors are constructed in single-strand (single-phase) form, this results in a very simple circuit and a simple motor structure, since only a single stator winding must be included, and the motor can thus be made compact. However, it should be noted that the present invention can also be used in multi-strand motors, e.g. for three-stranded (three-phase) motors which have three-pulse or six-pulse operating schemes.

The terminology used herein is more fully explained in the literature reference "ASR-Digest for Applied Drive Technology," by Rolf Mueller, 1977, pages 27–31. "Two-pulse" means that two current pulses are fed to the stator winding of the motor per 360° el. rotor rotation, as in the case of the motor shown in FIG. 1 below. In a three-pulse motor, three current pulses are fed to the stator winding per 360° el. rotor rotation, etc. "Single-strand" means that the motor has only one phase (strand), e.g. as shown in FIG. 1, following. "Two-strand" means that the motor has two phases, etc. To define an electronically commutated motor, both the number of pulses and the number of phases must be specified. In full-bridge circuits with transistors, one branch of the circuit employs pnp transistors, and the other branch employs npn transistors. While there are npn transistors whose voltage tolerance extends to 400 V, the highest voltage tolerance of pnp transistors is usually around 300 V, or maximally 350 V.

It is possible to drive such motors via MOSFET transistors with a rectified current derived from 230 V alternating current, e.g. as disclosed in EP 0 467 085 A1, HANS & MOINI/PAPST-MOTOREN, but not with a transistor full-bridge circuit, although this would be desirable on grounds of cost. The reason is that 230 V AC, with 10% overvoltage (which frequently occurs in power networks) upon rectification results, on the rectified-voltage side of the circuit, in voltage spikes of 358 V, and pnp transistors which stand up to such high voltage are not commercially available today.

SUMMARY OF THE INVENTION

Accordingly, it is a primary object of the present invention to provide a transistorized full-bridge driving circuit for an electronically commutated collectorless dc motor, in which burnout of the pnp transistors from overvoltage is avoided.

Briefly, this is accomplished by an arrangement with a collectorless dc motor commutated by a semiconductor circuit, with a rectified-current intermediate circuit supplied via a rectifier from an AC current network, the intermediate circuit having an input to which is applied a fluctuating rectified current with predetermined maximum values, with a transistor located between the rectifier and the collectorless dc motor, the transistor being driven as a variable resistor, and with limiting means, for limiting the voltage at the control input of this transistor to a value smaller than the predetermined maximal value of the fluctuating rectified voltage and which control voltage falls within the voltage-tolerance range of the semiconductor driving circuit of the collectorless dc motor. The use of the limiting means, in combination with the transistor operated as a variable resistor, limits the voltage in the rectified-current intermediate circuit to an upper value, e.g. 270 V, so that standard commercial pnp- and npn-transistors can be used for the semiconductor driving circuit for commutation of the collectorless dc motor, and in this manner the semiconductor circuit is protected from overvoltage conditions.

In the transistor, which is driven as a variable resistor, corresponding losses do arise, but one avoids losses which would otherwise occur in a corresponding low-voltage power supply, so that overall a very good operating level results.

BRIEF FIGURE DESCRIPTION

Further details and advantageous features of the invention are set forth in the following description and are shown in the drawings, but these represent only preferred embodiments and are not intended to limit the invention to the specific examples shown.

DETAILED DESCRIPTION

Figure 1:
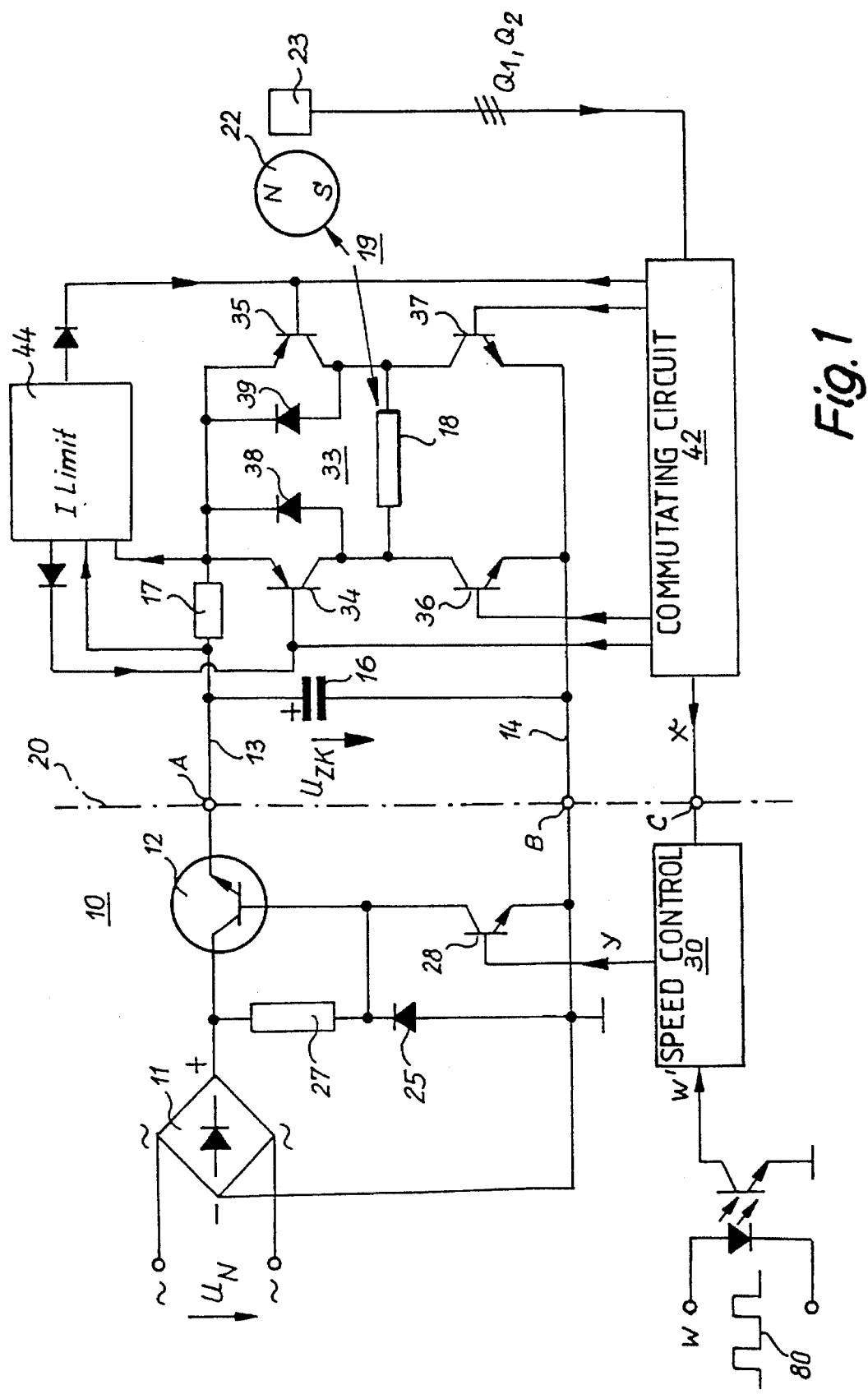
FIG. 1 is a diagram of the present invention, in which the commutating circuit, the rotary speed control, and the collectorless dc motor are only schematically illustrated.

FIG. 1 illustrates a preferred embodiment 10 of the invention. It has a standard bridge rectifier 11 for rectification of the network alternating voltage $U_N$ of, for example, 230 V, 50 Hertz. From this, there results, at the outputs + and − of rectifier 11, a pulsing dc voltage. This is fed via a transistor 12 to a rectified-current intermediate circuit across whose connecting lines 13 (+) and 14 (−), during operation, an intermediate circuit voltage $U_{ZK}$ is applied. In FIG. 1, a symbolic separation line 20 is shown dashed; it intersects with connecting points A, B, and C. Reference will be made to this separation line 20 and points A, B, C in describing FIGS. 6 and 7 below.

voltage $U_{ZK}$ is smoothed by a capacitor 16 connected between points A and B. A measuring resistor 17 serves for measurement of the current which flows to the single stator winding 18 of a collectorless dc motor 19, whose permanent-magnet rotor 22 is shown schematically at 22. Motor 19 is preferably a two-pulse single-strand collectorless dc motor; these terms are defined in the aforementioned literature reference ASR Digest. For detection of the rotational position of rotor 22, motor 19 has a rotor position sensor 23, whose preferred structure as a Hall IC is set forth in FIGS. 4 and 5.

The npn transistor 12 is connected as an emitter follower, i.e. its collector is at the output + of rectifier 11, and its emitter is at terminal 13 of rectified-current intermediate circuit 13, 14, while its base is connected to the cathode of a zener diode 25, whose anode is connected to the negative line 14, which in turn is connected to ground.

It is a characteristic of a transistor connected as an emitter follower that it reproduces the voltage, applied to its base, at its emitter terminal. Therefore, transistor 12 reproduces the voltage at the output of Zener diode 25 on the rectified-current intermediate circuit 13, 14, i.e. the voltage $U_{ZK}$ can not exceed this maximum value, for example 270 volts.

Figure 2:
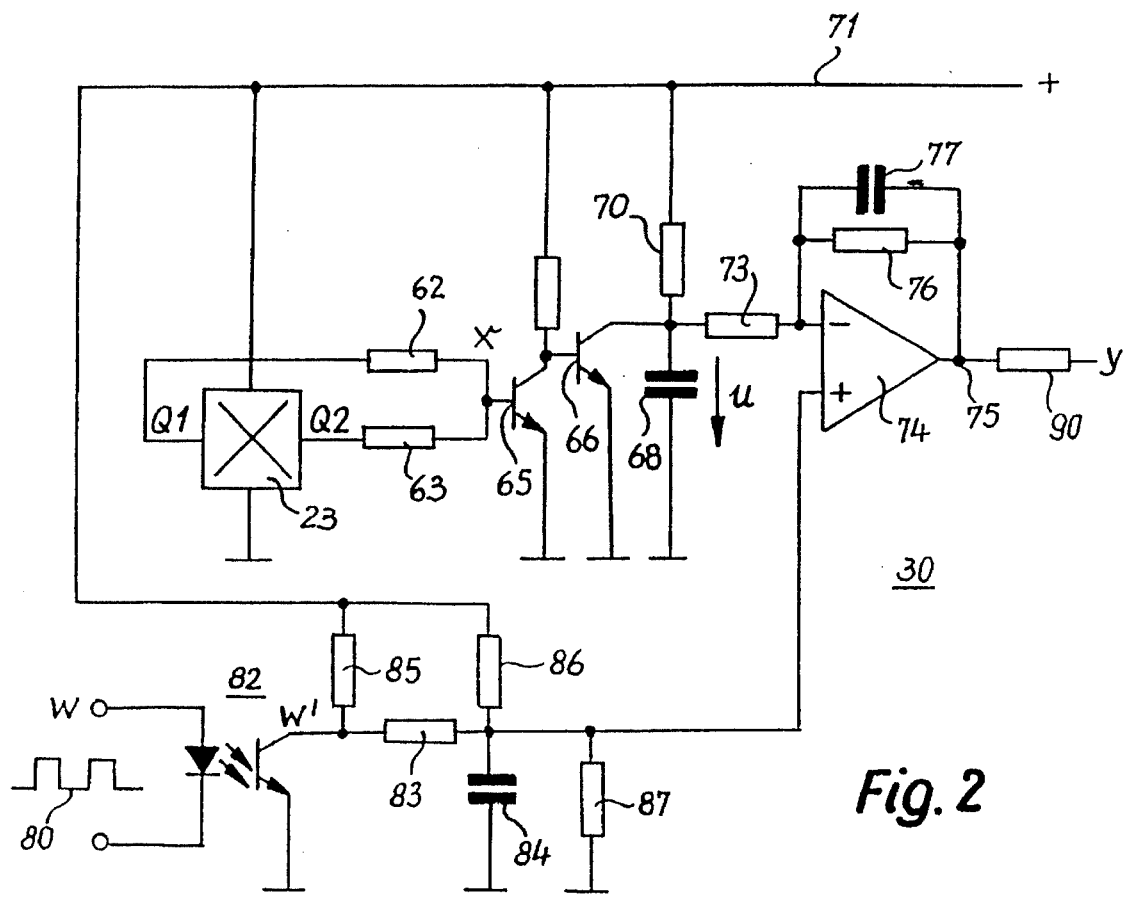
FIG. 2 is a diagram of a rotary speed control circuit which can advantageously be used in the device of FIG. 1.

In order to permit regulation of the rotation speed of motor 19, the voltage at Zener diode 25 can be reduced using a voltage divider, formed by a resistor 27 (between the Zener diode and the collector of transistor 12) and an NPN setting transistor 28, whose collector is connected with the base of transistor 12 and whose emitter is connected with line 14, while to its base is applied a signal Y frown a rotation speed controller 30, whose preferred structure is shown in FIG. 2. As those skilled in the art will recognize, by suitable adjustment of setting transistor 28, the voltage at Zener diode 25 can be reduced, which will also correspondingly reduce voltage $U_{ZK}$. This permits, in a very simple manner, a quick-responding control of rotation speed.

In order to reduce losses in setting transistor 28, the transistor 12 is preferably a Darlington transistor. Resistor 27 is preferably so dimensioned that transistor 12 can never be fully turned on. A voltage drop across transistor 12 results, and in normal operation, this limits the voltage $U_{ZK}$. Zener diode 25 serves as supplemental security, since the current-amplification factors of the transistors 12 have great excursions or variations.

Capacitor 16 smooths the voltage $U_{ZK}$ and takes up or absorbs the free-running currents of the stator winding 18 during commutation or during current limitation, which improves the efficiency. Capacitor 16 becomes repeatedly charged only up to a voltage specified by transistor 12 and the voltage on its base. Depending upon its capacitance, there results a corresponding residual wariness or ripple of voltage $U_{ZK}$. This capacitance should be chosen sufficiently large that the frequency of the ripple of $U_{ZK}$ does not carry over to influence the motor RPM.

A full bridge circuit 33 serves to control or regulate the stator winding 18. This has the usual H-shape, in which the upper branch has two PNP transistors 34, 35 and the lower branch has two NPN transistors 36, 37. The voltage tolerance of transistor 34, 35 is approximately 300 V. Connected in antiparallel to each of transistors 34, 35 is a respective recovery diode 38, 39; these become effective upon commutation and during current limitation. Stator winding 18, as shown, forms the crossbar of the H. If transistors 34 and 37 are conductive, a current flows in them from left to right, and, if transistors 35 and 36 are conductive, a current flows in them from right to left. The direction of this current depends upon the instantaneous position of rotor 22.

Figure 3:
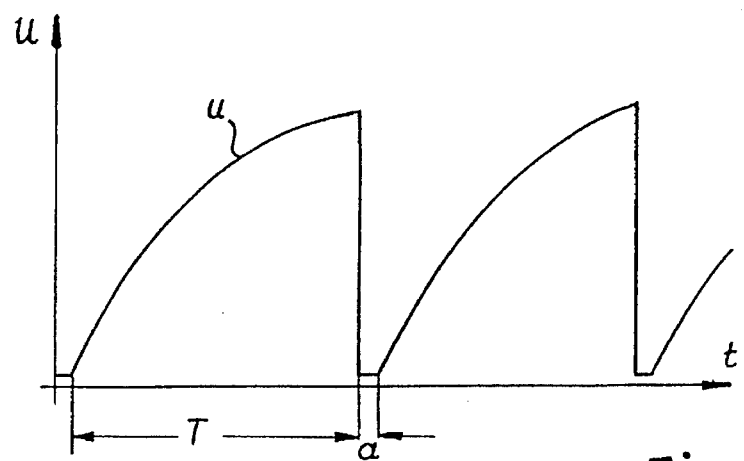
FIG. 3 is a diagram which explains the operation of FIG. 2, showing the voltage variations on capacitor 68, shown in FIG. 2.

The commutation is controlled by rotary position sensor 23, whose output signals Q1, Q2 are fed to a commutating circuit 42, which correspondingly controls transistors 34 through 37, and assures short current pauses upon commutation, so that transistors 34 through 37 of bridge 33 are never all simultaneously conductive; such a short-circuit condition would immediately destroy transistors 34 through 37. These current pauses are derived from rotary position sensor 23, whose output waveforms Q1 and Q2 are, as shown in FIG. 3, separated from each other by a gap a. Preferably, these current pauses are used also for rotation speed control. During commutation, current can flow through winding 18 via one of respective recovery diodes 38, 39 into capacitor 16, which provides energy recovery.

The motor current is limited by a current limitation subcircuit 44, which measures the current at measuring resistor 17 and blocks both upper bridge transistors 34, 35 when this current becomes too great. Alternately, circuit 44 can block both lower bridge transistors 36, 37, which under certain circumstances is more advantageous, since line 13 carries a potential of +270 V, while line 14 carries a potential of zero V. A corresponding circuit for current limitation is described in detail in Papst-Motoren German Utility Model 92 04 811, the contents of which are incorporated by reference.

Figure 4:
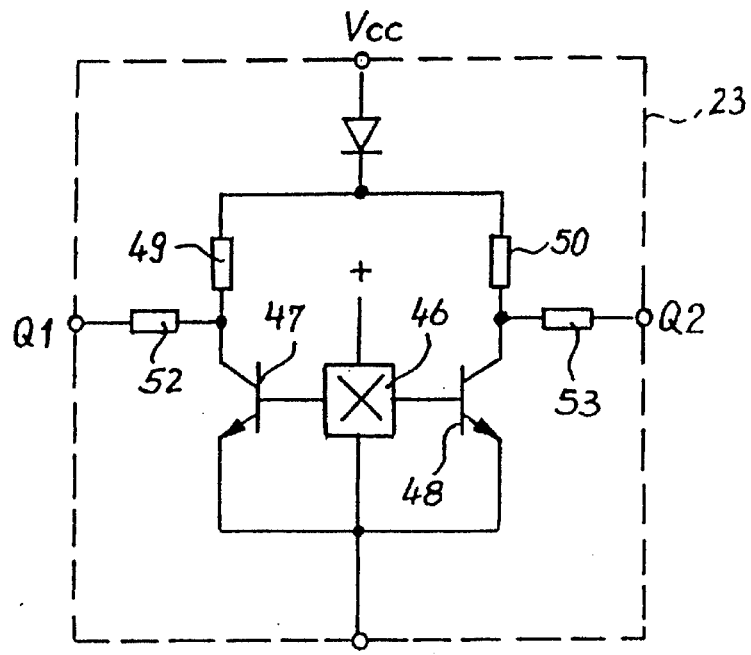
FIG. 4 is a diagram of a so-called Hall integrated circuit (IC) with two anti-valent outputs, so arranged that a small current gap occurs in the region of commutation.

FIG. 4 illustrates a preferred form of rotary position sensor 23. The output signals of its Hall element 46 are amplified by a respective associated transistor 47, 48. Each transistor is connected via a respective collector resistor 49, 50 and a common diode to the positive voltage terminal Vcc. Between each collector and its associated collector resistor 49, 50, is a tap which leads via a respective resistor 52, 53 to respective outputs Q1, Q2.

If the magnetic flux density Φ at Hall element 46 varies according to curve 55 on graph 5a (FIG. 5), transistor 47 switches on at time 56 and, due to switching hysteresis Hys. 1, switches off at time 57, i.e. at lower magnetic flux density. This results in signal Q1 (graph 5b, FIG. 5).

Analogously, transistor 48 switches on at time 58 and switches off at time 59, these points being separated by switching hysteresis Hys. 2, as shown. This results in signal Q2 (graph 5c, FIG. 5). Signals Q1, Q2 therefore have between them the aforementioned gaps a, whose size is a function of the form of magnetization of rotor 22, but which are present in every case, as those skilled in the art will immediately recognize.

As shown in FIG. 2, signals Q1 and Q2 of sensor 23 pass respectively through identical resistors 62 and 63 and are logically combined in commutation circuit 42. At the output of these resistors, there is thus the signal X (shown also in FIG. 1) which combines signals Q1 and Q2 like an OR operator and is only low during the gaps a. This low signal serves as a rotary speed signal. It immediately goes high whenever one of signals Q1 and Q2 is present.

Figure 5:
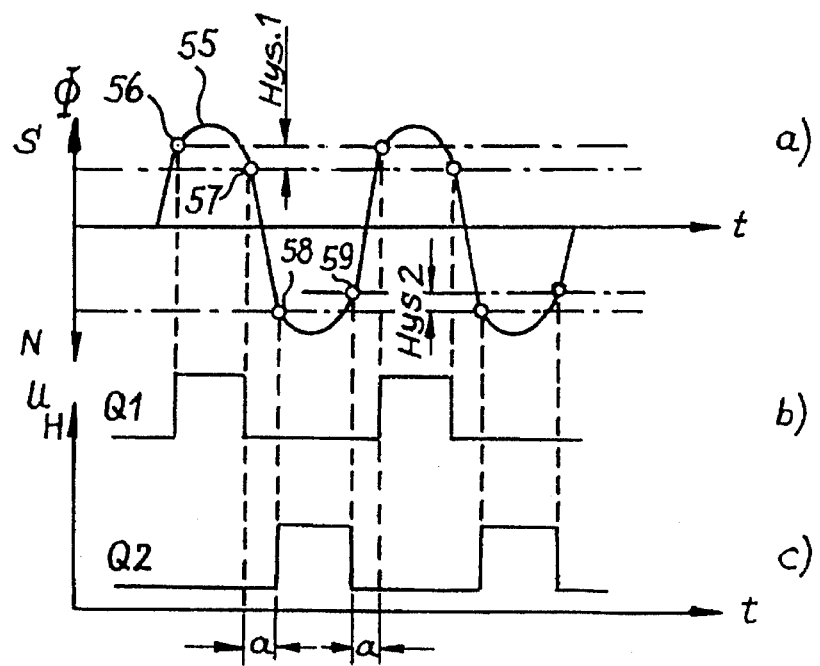
FIG. 5 is a diagram which explains the operation of the Hall IC of FIG. 4.

This signal X is fed, as shown in FIG. 2, to the base of an NPN transistor 65, which is therefore blocked only during the gaps a (FIGS. 3 and 5). As long as NPN transistor 65 is blocked, an NPN transistor 66, connected to it, remains conductive and very quickly discharges a capacitor 68, which is connected in parallel to transistor 66 to ground. As shown in FIG. 2, capacitor 68 continuously receives charging current via a charging resistor 70 which is connected to a positive voltage line 71. After the end of each gap a, i.e. after the end of the discharge, the capacitor begins again to charge, and is fed charging current via resistor 70 until the next gap a occurs.

FIG. 3 is a graph of the voltage u on capacitor 68. As one will readily understand, the time interval T (FIG. 3) is longer at low rotation speeds, and voltage u on capacitor 68 can therefore reach higher values at low rotation speeds than at high rotation speeds. The peak voltage on capacitor 68 is thus a function of rotation speed, i.e. when rotation speed rises, the peak voltage is reduced. This voltage is fed via a resistor 73 to the − input of an operational amplifier 74, which is connected as a differential amplifier and integrator. For this purpose, between its output 25 and its − input, there are connected, in parallel, a resistor 76 and a capacitor 77.

The "target value" signal 80 (FIGS. 1, 2, 6 & 7) for the rotation speed is a Pulse Width Modulation (PWM) signal which is fed to the input w of an optical coupler 82, which furnishes at its output a corresponding signal w'. The information content of this signal is in its duty factor (see German Utility Model DE-Gm 92 04 811) and this information can control various functions of motor 19, as thoroughly described in the Utility Model.

Signal w' is integrated using a resistor 83 and a capacitor 84, and converted into a rectified voltage, whose height is dependent upon the duty factor. This rectified voltage is fed to the + input of operational amplifier 74. Resistors 85, 86, and 87, shown in FIG. 2, serve for level matching for the + input of operational amplifier 74.

OPERATIONAL MODE OF FIG. 2

The difference between the rotation rate target value signal (voltage on capacitor 84) and the rotation rate actual value signal (voltage on capacitor 68) is amplified in operational amplifier 74, and integrated by capacitor 77. Through the integration, there results, at output 75 of operational amplifier 74, a rectified voltage signal Y, which linearly controls, via resistor 90, the setting transistor 28 (FIG. 1). During the control process, the resistance of transistor 12 is correspondingly varied, to increase or decrease voltage $U_{ZK}$ correspondingly.

The rotation speed controller according to FIG. 2 is a P-controller; its amplification factor (P-component) is determined by the ratio of resistances 73 and 76.

Figure 6:
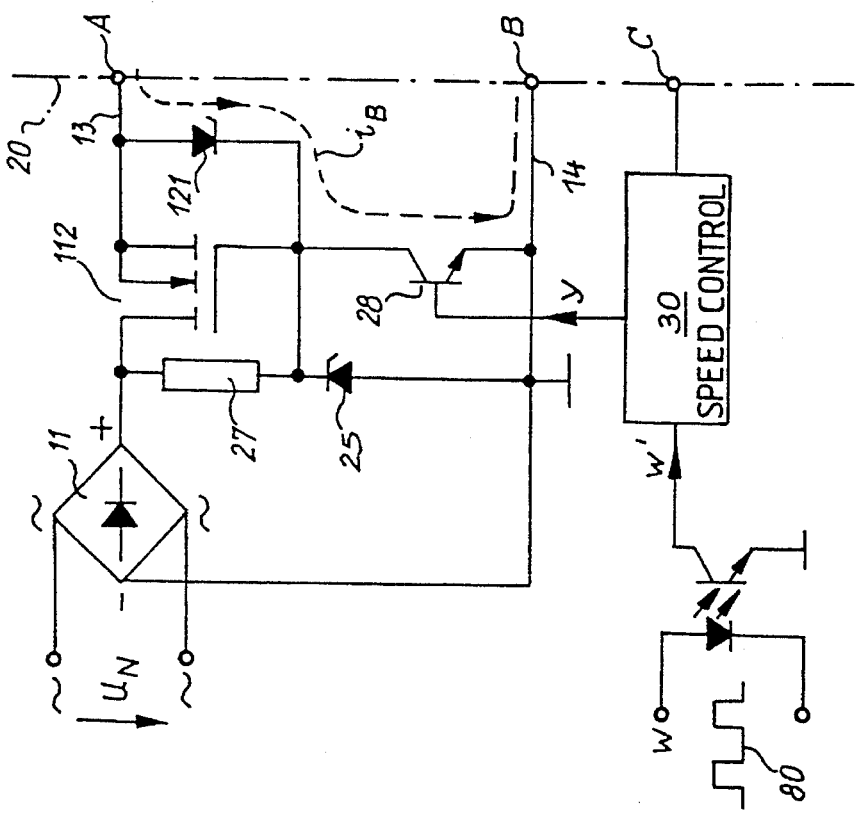
FIG. 6 illustrates a first variant of the circuit of FIG. 1.

FIG. 6 illustrates a first variant of the circuit of FIG. 1. The only components newly represented are those which in FIG. 1 fall to the left of symbolic separating line 20. The components to the right of separating line 20 are the same as those in FIG. 1. The same is true of FIG. 7, which represents a second variant of the circuit of FIG. 1.

Figure 7:
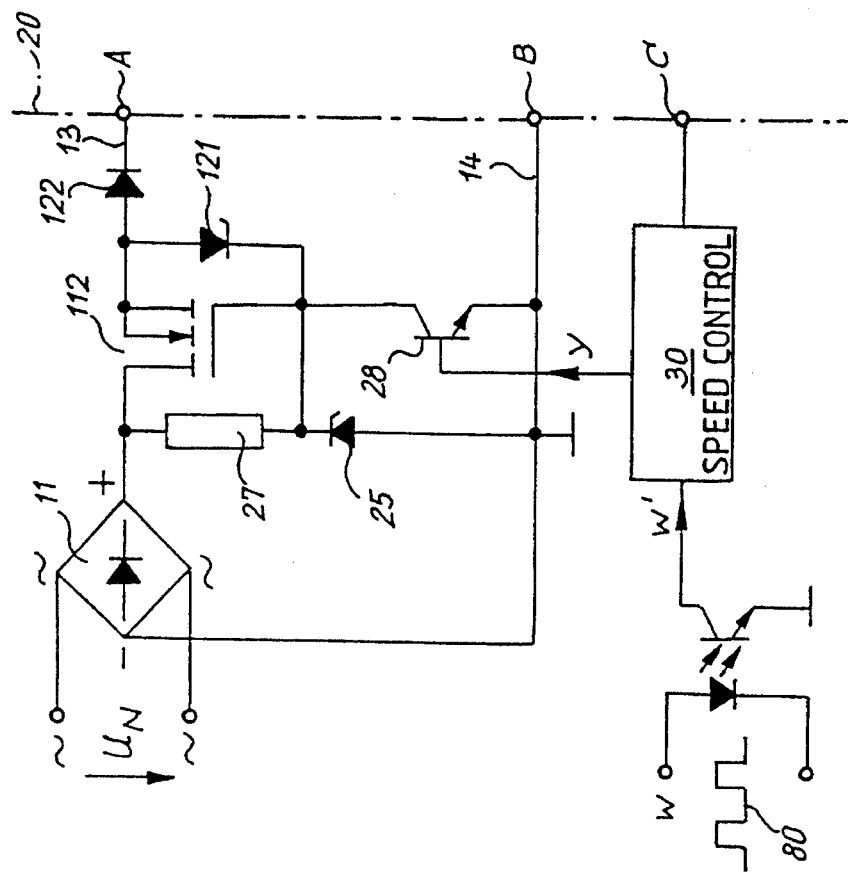
FIG. 7 illustrates a second variant of the circuit of FIG. 1.

In the circuits of FIGS. 6 and 7, the bipolar transistor 12 is replaced by a power MOSFET 112 (here an n-channel MOSFET), which is better adapted for the application than a bipolar power transistor (MOSFET is an acronym for Metal Oxide Semiconductor Field Effect Transistor). The reason for this is that, with MOSFET 112, only "temperature de-rating" must be taken into account, while with a bipolar power transistor, one must also take into account the "safe operating area" for the second breakdown. Tests have shown that a power MOSFET is a better solution here. For protection of the MOSFET, a Zener diode 121 should be connected between source S (line 13) and gate G of MOSFET 112, as shown in FIGS. 6 and 7.

The drain D of MOSFET 112 is connected to the + output of rectifier 11; source S is connected to line 13, and gate G is connected to the collector of setting transistor 28. This circuit operates fully analogously to that of FIG. 1, i.e., the voltage on source S follows the voltage on gate G just as, with the emitter circuit of FIG. 1, the voltage at the emitter of transistor 12 follows the voltage at its base. Assuming, e.g., that the voltage at gate G is 100 V, the voltage at source S will be about 95 V, namely the gate voltage less the gate-source voltage drop of about 4.5 V. By analogy to the "emitter circuit" one could call this circuit a "source circuit." For one skilled in the art, it is clear that in principle these are the same circuit, even though there is a familiar designation for only one of the circuits.

The circuit of FIG. 6 provides a particularly good control characteristic. If an abrupt change of target value signal 80 at a high rotation speed suddenly presents a target value for a low rotation speed, the motor is braked by the circuit of FIG. 6. In this case, transistor 28 fully conducts, and the Zener diode 121 is driven in the forward direction, so that a braking current iB flows, as shown by the dashed line in FIG. 6. This current drains off toward ground the energy stored in capacitor 16 (FIG. 1), thereby braking motor 19, which is driven in this case in a generating mode and practically as a short circuit. When such a braking mode of operation is desired, Zener diode 121 and setting transistor 28 must be rated for a sufficiently high power level.

It should be noted that this braking-operation mode also occurs with the circuit of FIG. 1, since there the base-emitter path of transistor 12 operates in this case like a Zener diode, so that a braking current also flows there.

If a braking-operation mode is not desired, in order to avoid higher costs for setting transistor 28, one can connect a diode 122 between MOSFET 112 and point A, as shown in FIG. 7. The diode blocks the flow of the current $i_B$ shown in FIG. 6. If the circuit of the invention is used, e.g., for driving the motor 19 of a blower (not shown), a faster braking process is unnecessary, since the blower inherently goes slower when less energy is fed to it. Diode 122 can be used, in the same fashion in the circuit of FIG. 1, in order to hinder the flow of a braking current.

Suitable components/values for the circuit of FIG. 7 are:

| | |
|---|---|
| $U_N$ = 230 V, 50 Hz | |
| MOSFET 112 | STP4N4OFI made by SGS-THOMSON |
| Zener diode 121 | 12 V |
| Zener diode 25 | 270 V |
| Resistor 27 | 100 kOhm |
| Transistor 28 | MPSA44 |

Since the control electronics, with the transistor 12 or the MOSFET 112, use no pulse-type signals, but rather flowing changes, there occur, on the conductive leads of circuit 10, very few electrical disturbances, and one needs no supplemental filters to stay within the legally prescribed boundary limits, the so-called EMI (Electro-Magnetic Interference) limits.

The end stage 33 does not absolutely have to be a full bridge. For example, a two-stranded or two-phase solution would also be possible, as shown in EP 0 467 085 A1, HANS & MOINI. In this case, the voltage $U_{ZK}$ can be higher, so that the losses in transistor 12 or 112 become smaller. However, the embodiments shown are preferred. Still other variations are possible. For example, one could use the positive edge of signal Q1 as the rotation speed signal, and other types of rotor position sensors could be used, in which the rotor position is derived from the motor current or other values (the so-called sensor-less principle).

A very important advantage of the present invention is the elimination of the need for a component to supply low voltage to motor 19. This avoids significant expense. However, there are increased costs for a higher insulation class for winding 18, and due to the use of power transistors with high voltage tolerance and due to the use of correspondingly powerful transistors 12 and 112. Overall, there is a substantial savings in cost—and in required size—as a result of the present invention. The invention can be used in many applications, e.g. for fans, vacuum cleaners, scanners, pump, medical-technical devices, blowers for gas- and oil-burners, and others. The invention has a very broad range of applications or uses, since it also makes possible simple rotational speed control and current limitation. It is particularly advantageous in connection with a single-stranded collectorless dc motor, since here the expense for the electronics, and for the insulation of winding 18, is particularly small.

What is claimed is:

1. An apparatus including a semiconductor control circuit (34, 35, 36, 37) for commutating a collectorless dc motor (19), having a rectifier (11) supplied with alternating current power;

two dc conductors, serving as output lines from said rectifier;

a rectified-current-source intermediate circuit (13, 14) connected to an output of said rectifier (11), receiving a wavy (ripple-containing) dc voltage with predetermined maximum values;

a MOSFET (112), operated as a variable resistor, whose source-drain path is connected, in series with one of said dc conductors, between said rectifier (11) and said collectorless dc motor (19);

a Zener diode (121), connected in parallel to said source-drain path of said MOSFET; and means (25, 27, 28) for limiting voltage, at a control input of said MOSFET, to a value which is smaller than said maximum values of said dc voltage and which falls within a voltage-tolerance range of said semiconductor control circuit (34, 35, 36, 37) of said collectorless dc motor (19).

2. An apparatus according to claim 1, further comprising a smoothing capacitor (16) connected in said dc current intermediate circuit 13, 14) and so dimensioned that it prevents ripple in said dc voltage signal ($U_{ZK}$) in said intermediate circuit (13, 14) from causing rotation speed fluctuations in said motor (19).

3. An apparatus according to claim 1, further comprising a smoothing capacitor (16) connected in said dc current intermediate circuit (13, 14) and so dimensioned that it prevents ripple in said dc voltage signal ($U_{ZK}$) in said intermediate circuit (13, 14) from causing rotation speed fluctuations in said motor (19).

4. An apparatus according to claim 1, wherein the voltage at said limiting means (25, 27, 28) is variable for controlling rotation speed of said motor (19), by changing a resistance value of said transistor (112) to control said rotation speed.

5. An apparatus according to claim 1, wherein said collectorless dc motor (19) is a two-pulse-driven single-stranded motor (19).

6. An apparatus including a semiconductor control circuit (34, 35, 36, 37) for commutating a collectorless dc motor (19), having a rectifier (11) supplied with alternating current power;

two dc conductors, serving as output lines from said rectifier;

a rectified-current-source intermediate circuit (13, 14) connected to an output of said rectifier (11), receiving a wavy (ripple-containing) dc voltage with predetermined maximum values;

a MOSFET (112), operated as a variable resistor, whose source-drain path is connected, in series with one of said dc conductors, between said rectifier (11) and said collectorless dc motor (19);

means (25, 27, 28) for limiting voltage, at a control input of said MOSFET (112), to a value which is smaller than said maximum values of said dc voltage and which falls within a voltage-tolerance range of said semiconductor control circuit (34, 35, 36, 37) of said collectorless dc motor (19); and a diode (122) connected in series between said MOSFET (112) operated as a variable resistor and said collectorless dc motor (19), said diode hindering a flow of braking current ($i_B$) from said motor (19) to said MOSFET (112).

7. An apparatus, including a semiconductor control circuit for commutating a collectorless dc motor, having a rectifier supplied with alternating current power;

two dc conductors, serving as output lines from said rectifier; a rectified-current-source intermediate circuit connected to an output of said rectifier, receiving a wavy (ripple-containing) dc voltage with predetermined maximum values;

a bipolar transistor (12), operated as a variable resistor, whose collector-emitter path is connected, in series with one of said dc conductors, between said rectifier and said collectorless dc motor; and means (25, 27, 28) for limiting voltage, at a control input of said bipolar transistor, to a value which is smaller than said maximum values of said dc voltage and which falls within a voltage-tolerance range of said semiconductor control circuit of said collectorless dc motor, said voltage limiting means including a voltage limiting member (25) and a voltage divider (27,28), including at least one variable resistance connected in parallel to said voltage limiting member, said voltage divider including a setting transistor (28) whose resistance is controllable.

8. An apparatus according to claim 7, wherein said setting transistor (28) has a control terminal connected to an output (Y) of a rotation speed controller (30).

9. An apparatus according to claim 8, further comprising a rotor position sensor (23), in said collectorless dc motor (19), having an output which provides an input signal (x) to said rotation speed controller (30).

10. An apparatus according to claim 9, wherein said rotor position sensor (23) generates two different signals (Q1, Q2) separated from each other by respective gaps (a), said different signals are logically combined, and the thus-formed combination signal serves as said rotation speed controller input signal (x).

11. An apparatus according to claim 9, further comprising a charging capacitor (68), a source (70) for charging current thereto, and means (66) for repeatedly quickly discharging said charging capacitor (68) at a frequency proportional to rotary speed of said motor (19).

12. An apparatus according to claim 10, further comprising a charging capacitor (68), a source (70) for charging current thereto, and means (66) for repeatedly quickly discharging said charging capacitor (68) at a frequency proportional to rotary speed of said motor (19).

13. An apparatus according to claim 11, further comprising an operational amplifier (74), connected as an integrating circuit and as a differential amplifier, and having first and second inputs and an output, said first input being coupled to a voltage (73) on said charging capacitor (68), said second input being connected to a source of target value signals, and said output (Y) serving to vary resistance of said transistor (12) operated as a variable resistor.

14. An apparatus, including a semiconductor control circuit (34, 35, 36, 37) for commutating a collectorless dc motor (19), having a rectifier (11) supplied with alternating current power;

two dc conductors, serving as output lines from said rectifier;

a rectified-current-source intermediate circuit (13, 14) connected to an output of said rectifier (11), receiving a wavy (ripple-containing) dc voltage with predetermined maximum values;

a MOSFET (112), operated as a variable resistor, whose source-drain path is connected, in series with one of said dc conductors, between said rectifier (11) and said collectorless dc motor (19); and means (25, 27, 28) for limiting voltage, at a control input of said MOSFET (112), to a value which is smaller than said maximum values of said dc voltage and which falls within a voltage-tolerance range of said semiconductor control circuit (34, 35, 36, 37) of said collectorless dc motor (19);

said semiconductor circuit for commutating said dc motor including a full bridge circuit containing power transistors having voltage tolerances which are at least 300 volts and which are smaller than the maximum values of the ripple-containing voltage signals at said output of said rectifier (11).

15. An apparatus including a semiconductor control circuit for commutating a collectorless dc motor, having a rectifier supplied with alternating current power;

two dc conductors, serving as output lines from said rectifier;

a rectified-current-source intermediate circuit connected to an output of said rectifier, receiving a wavy (ripple-containing) dc voltage with predetermined maximum values;

a bipolar transistor (12), operated as a variable resistor, whose collector-emitter path is connected, in series with one of said dc conductors, between said rectifier and said collectorless dc motor; and means (25, 27, 28) for limiting voltage, at a control input of said bipolar transistor, to a value which is smaller than said maximum values of said dc voltage and which falls within a voltage-tolerance range of said semiconductor control circuit of said collectorless dc motor;

said semiconductor circuit for commutating said dc motor including a full bridge circuit containing power transistors having voltage tolerances which are at least 300 volts and which are smaller than maximum values of rippling dc voltage signals at an output of said rectifier (11).

16. A fuel burner including a blower whose motor (19) which is a collectorless dc motor commutated by a semiconductor control circuit having a rectifier (11) supplied with alternating current power;

a rectified-current-source intermediate circuit (13, 14) connected to an output of said rectifier (11), receiving a wavy (ripple-containing) dc voltage with predetermined maximum values;

a transistor, operated as a variable resistor, whose source-drain path is connected between said rectifier (11) and said collectorless dc motor (19); and means (25, 27, 28) for limiting voltage, at a control input of said transistor, to a value which is smaller than said maximum values of said dc voltage and which falls within a voltage-tolerance range of said semiconductor control circuit (34, 35, 36, 37) of said collectorless dc motor (19).

17. An apparatus including a semiconductor control circuit for commutating a collectorless dc motor, having a rectifier supplied with alternating current power;

two dc conductors, serving as output lines from said rectifier;

a rectified-current-source intermediate circuit connected to an output of said rectifier, receiving a wavy (ripple-containing) dc voltage with predetermined maximum values;

a MOSFET (112), operated as a variable resistor, whose drain-source path is connected, in series with one of said dc conductors, between said rectifier and said collectorless dc motor; and means (25, 27, 28) for limiting voltage, at a control input of said MOSFET (112), to a value which is smaller than said maximum values of said dc voltage and which falls within a voltage-tolerance range of said semiconductor control circuit of said collectorless dc motor, said voltage limiting means including a voltage limiting element (25) and a voltage divider, including at least one variable resistance connected in parallel to said voltage limiting element, said voltage divider including a setting transistor (28) whose resistance is controllable.

18. An apparatus according to claim 17, wherein said setting transistor (28) has a control terminal connected to an output (Y) of a rotation speed controller (30).

19. An apparatus according to claim 18, further comprising a rotor position sensor (23), in said collectorless dc motor (19), having an output which provides an input signal (x) to said rotation speed controller (30).

20. An apparatus according to claim 19, wherein said rotor position sensor (23) generates two different signals (Q1, Q2) separated from each other by respective gaps (a), said different signals are logically combined, and the thus-formed combination signal serves as said rotation speed controller input signal (x).

21. An apparatus according to claim 19, further comprising a charging capacitor (68), a source (70) for charging current thereto, and means (66) for repeatedly quickly discharging said charging capacitor (68) at a frequency proportional to rotary speed of said motor (19).

22. An apparatus according to claim 20, further comprising a charging capacitor (68), a source (70) for charging current thereto, and means (66) for repeatedly quickly discharging said charging capacitor (68) at a frequency proportional to rotary speed of said motor (19).

23. An apparatus according to claim 21, further comprising an operational amplifier (74), connected as an integrating circuit and as a differential amplifier, and having first and second inputs and an output, said first input being coupled to a voltage (73) on said charging capacitor (68), said second input being connected to a source of target value signals, and said output (Y) serving to vary resistance of said transistor (12) operated as a variable resistor.

* * * * *